United States Patent
Fukuda et al.

(10) Patent No.: US 11,877,090 B2
(45) Date of Patent: Jan. 16, 2024

(54) CONTROL DEVICE, IMAGE RECORDING METHOD, AND RECORDING MEDIUM

(71) Applicant: Mitsubishi Electric Corporation, Tokyo (JP)

(72) Inventors: Mitsudo Fukuda, Tokyo (JP); Yusuke Takenaka, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/912,529

(22) PCT Filed: Dec. 17, 2020

(86) PCT No.: PCT/JP2020/047264
§ 371 (c)(1),
(2) Date: Sep. 19, 2022

(87) PCT Pub. No.: WO2022/130589
PCT Pub. Date: Jun. 23, 2022

(65) Prior Publication Data
US 2023/0164290 A1    May 25, 2023

(51) Int. Cl.
*H04N 5/91* (2006.01)
*H04N 5/77* (2006.01)
*H04N 7/18* (2006.01)

(52) U.S. Cl.
CPC .............. *H04N 5/91* (2013.01); *H04N 5/77* (2013.01); *H04N 7/183* (2013.01)

(58) Field of Classification Search
None
See application file for complete search history.

(56) References Cited

U.S. PATENT DOCUMENTS

2004/0257242 A1* 12/2004 Bruemmer ............... H04Q 9/00
340/870.14
2005/0041692 A1* 2/2005 Kallstenius ........... H04J 3/0667
370/503

(Continued)

FOREIGN PATENT DOCUMENTS

JP    2006-329759 A    12/2006
JP    2011-29969 A    2/2011

(Continued)

OTHER PUBLICATIONS

International Search Report and Written Opinion dated Feb. 9, 2021, received for PCT Application PCT/JP2020/047264, filed on Dec. 17, 2020, 8 pages including English Translation.

*Primary Examiner* — Hung Q Dang
(74) *Attorney, Agent, or Firm* — XSENSUS LLP

(57) ABSTRACT

A control device is connected to a control-target machine and an imaging device (22). The control device includes a first receiver (41) to repetitively receive image data indicating an image captured by the imaging device (22) and containing a first timestamp indicating an elapsed time since a specific time in association with the image, a second receiver (42) to receive communication data related to a history of communication at the imaging device (22) and containing a second timestamp indicating an elapsed time since the specific time and transmission time data indicating a transmission time of transmitting the communication data, and a recorder (43) to cause storages (433, 44) to store association data on the basis of comparison between the first timestamp and the second timestamp that corresponds to the transmission time. The association data indicates a corresponding time corresponding to the first timestamp in association with the image.

4 Claims, 12 Drawing Sheets

(56) References Cited

U.S. PATENT DOCUMENTS

2018/0324385 A1  11/2018  Suzuki
2020/0125061 A1   4/2020  Miyasaka
2021/0013981 A1*  1/2021  Ueda ..................... G16H 40/67

FOREIGN PATENT DOCUMENTS

JP      2020-13526 A    1/2020
WO    2017/126131 A1   7/2017

* cited by examiner

CONTROL DEVICE, IMAGE RECORDING METHOD, AND RECORDING MEDIUM

CROSS-REFERENCE TO RELATED APPLICATION

The present application is based on PCT filing PCT/JP2020/047264, filed Dec. 17, 2020, the entire contents of which are incorporated herein by reference.

TECHNICAL FIELD

The present disclosure relates to a control device, an image recording method, and a program.

BACKGROUND ART

In fields of factory automation (FA), control devices control various machines and thereby achieve lines represented by production lines, processing lines, and inspection lines. In order to manage the processes of the lines, some control devices record images of the lines. At occurrence of a trouble, such as a stop of the line, an investigation of the situation at occurrence of the trouble using the recorded images is made to find the cause of the trouble. For example, a captured image is compared with data logged at a programmable logic controller (PLC) serving as a control device to understand the detailed situation at occurrence of a trouble and thereby analyze the cause of the trouble (for example, refer to Patent Literature 1).

Patent Literature 1 discloses that the PLC includes a basic unit to execute a ladder program for controlling various machines installed in a factory and an extension unit to which image data is input from a camera serving as a field device. The extension unit provides the basic unit with time information and image data acquired at the camera in association with each other. The PLC disclosed in Patent Literature 1 can display a device value stored in the basic unit and the image data in association with time, and thus facilitate a user to find the cause of the trouble.

CITATION LIST

Patent Literature

Patent Literature 1: Unexamined Japanese Patent Application Publication No. 2020-13526

SUMMARY OF INVENTION

Technical Problem

In the extension unit disclosed in Patent Literature 1, a collector outputs a trigger signal, for example, in response to satisfaction of the collection condition that a relay device is turned on. The trigger signal causes a time manager of the extension unit to read time information from an internal clock, and causes the camera to output captured image data.

Unfortunately, acquisition of image data causes a communication delay between the extension unit and the camera, while acquisition of time executed as an internal process in the extension unit is completed within a relatively short time. The time associated with the image data in the extension unit therefore deviates from the actual time of image capture at the camera. This deviation may cause a user responsible for follow-up investigation of images to mistake the actual time of occurrence of the trouble included in the captured image, and inhibit the captured image from being aligned with data logged at the control device, such as the PLC, resulting in inconvenience. This situation demands provision of more convenient times to data on images acquired by the control device from the outside.

An objective of the present disclosure is to provide more convenient times to data on images acquired by the control device from the outside.

Solution to Problem

In order to achieve the above objective, a control device according to an aspect of the present disclosure is connected to a control-target machine and an imaging device to control the control-target machine, and includes: first reception means for repetitively receiving pieces of image data each indicating an image captured by the imaging device and related to control of the control-target machine, the piece of image data containing a first timestamp indicating an elapsed time since a specific time in association with the image; second reception means for receiving a piece of communication data related to a history of communication at the imaging device, the piece of communication data containing a second timestamp indicating an elapsed time since the specific time and a piece of transmission time data indicating a transmission time of transmission of the piece of communication data; and recording means for causing storage means to store a piece of association data on the basis of comparison between the first timestamp associated with the image indicated by the image data and the second timestamp corresponding to the transmission time, the piece of association data indicating a corresponding time in association with the image, the corresponding time corresponding to the first timestamp.

Advantageous Effects of Invention

According to an aspect of the present disclosure, the first reception means receives the image data containing the first timestamp, the second reception means receives the communication data containing the second timestamp, and the recording means causes the storage means to store the association data, which indicates the corresponding time corresponding to the first timestamp in association with the image, on the basis of comparison between the first timestamp and the second timestamp. Accordingly, the image is provided with the corresponding time corresponding to the first timestamp, which was preliminarily provided before reception at the first reception means. This configuration can thus provide more convenient times to data on images acquired by the control device from the outside without being affected by communication delays.

DESCRIPTION OF EMBODIMENTS

A control device 10 according to embodiments of the present disclosure is described in detail below with reference to the accompanying drawings.

Embodiment 1

Figure 1:
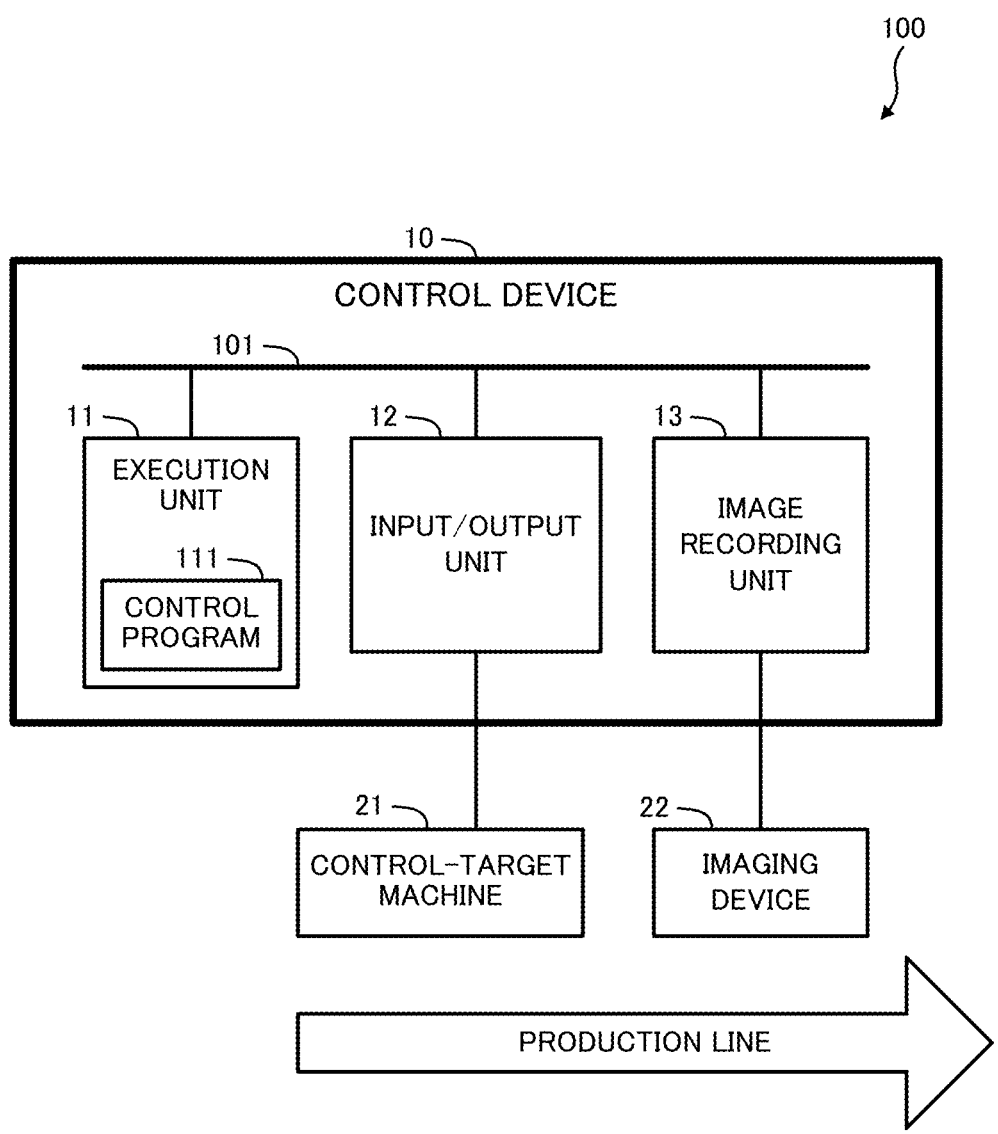
FIG. 1 illustrates a configuration of a control system according to Embodiment 1.

FIG. 1 illustrates a configuration of a control system 100 including the control device 10 according to this embodiment. The control system 100 is established in a factory to run a production line, and captures and records images in preparation for investigation of a trouble. The control system 100 includes the control device 10 to control a control-target machine 21, the control-target machine 21 installed in the production line, and an imaging device 22 to capture images of situations related to the production line.

The control-target machine 21 and the imaging device 22 are connected to the control device 10 via an industrial network. Either one or both of the control-target machine 21 and the imaging device 22 may communicate with the control device 10 by a procedure other than the communication via the industrial network. Examples of the other procedure include communication via a local area network (LAN) as an information network or a dedicated line, and one-way communication of transmitting current signals or voltage signals via wiring.

The control-target machine 21 is a sensor, actuator, robot, or other FA machine installed in the production line. The control-target machine 21 is connected to an input/output unit 12 of the control device 10 and operates under the instructions from the control device 10. For example, the control-target machine 21, serving as a sensor, notifies the control device 10 with sensing results in the cycles designated by the control device 10. The control-target machine 21, serving as an actuator, causes a workpiece to travel at the timing and the speed designated by the control device 10. Although FIG. 1 illustrates a representative control-target machine 21, the control device 10 may control two or more machines in the control system 100. The one or more control-target machines 21 are controlled by the control device 10 and thereby run the production line.

The imaging device 22 includes a camera and captures images of situations related to the control of the control-target machine 21 by the control device 10. The images record a field where the control-target machine 21 operates. The images do not necessarily record the control-target machine 21 itself, and a subject to be imaged by the imaging device 22 may be the control-target machine 21, a workpiece or belt conveyor in the production line, or an environment involving the control system 100. In an exemplary case where the control system 100 runs a line for manufacturing a food product, the imaging device 22 may monitor an entrance of the factory provided with the control system 100 by capturing images, which are used to determine whether an insect enters the factory. In order to stop the operations of the control system 100 due to insect contamination, the images related to operations of the control-target machine 21 are captured and used to determine whether the control-target machine 21 needs to be controlled to stop the operations. In order to remove the insect in an inspection process, the images related to operations of the control-target machine 21 are captured and used because the operations of the control-target machine 21 controlled by the control device in the inspection process vary depending on the existence of an insect. The above-described configuration of capturing images of the entrance of the factory is a mere example. The images captured by the imaging device 22 may also be images that can be changed by the operations of the control-target machine 21 controlled by the control device 10, images that can vary in association with the operations, or images to be used to determine the operations.

The images captured by the imaging device 22 may be still images or video images, or may be other images, such as images of visible light and thermal images. The imaging device 22 repetitively transmits pieces of image data indicating captured images to an image recording unit 13 of the control device 10. The cycle of transmission of the image data is defined to be one second, one minute, or one hour, for example. Each of the pieces of image data repetitively transmitted from the imaging device 22 is provided with a timestamp indicating an elapsed time since a specific time. The timestamp is information indicating a timing of provision of the timestamp, and the timestamp provided to a piece of image data indicates an elapsed time since the specific time until the time point of provision of this timestamp.

Figure 2:
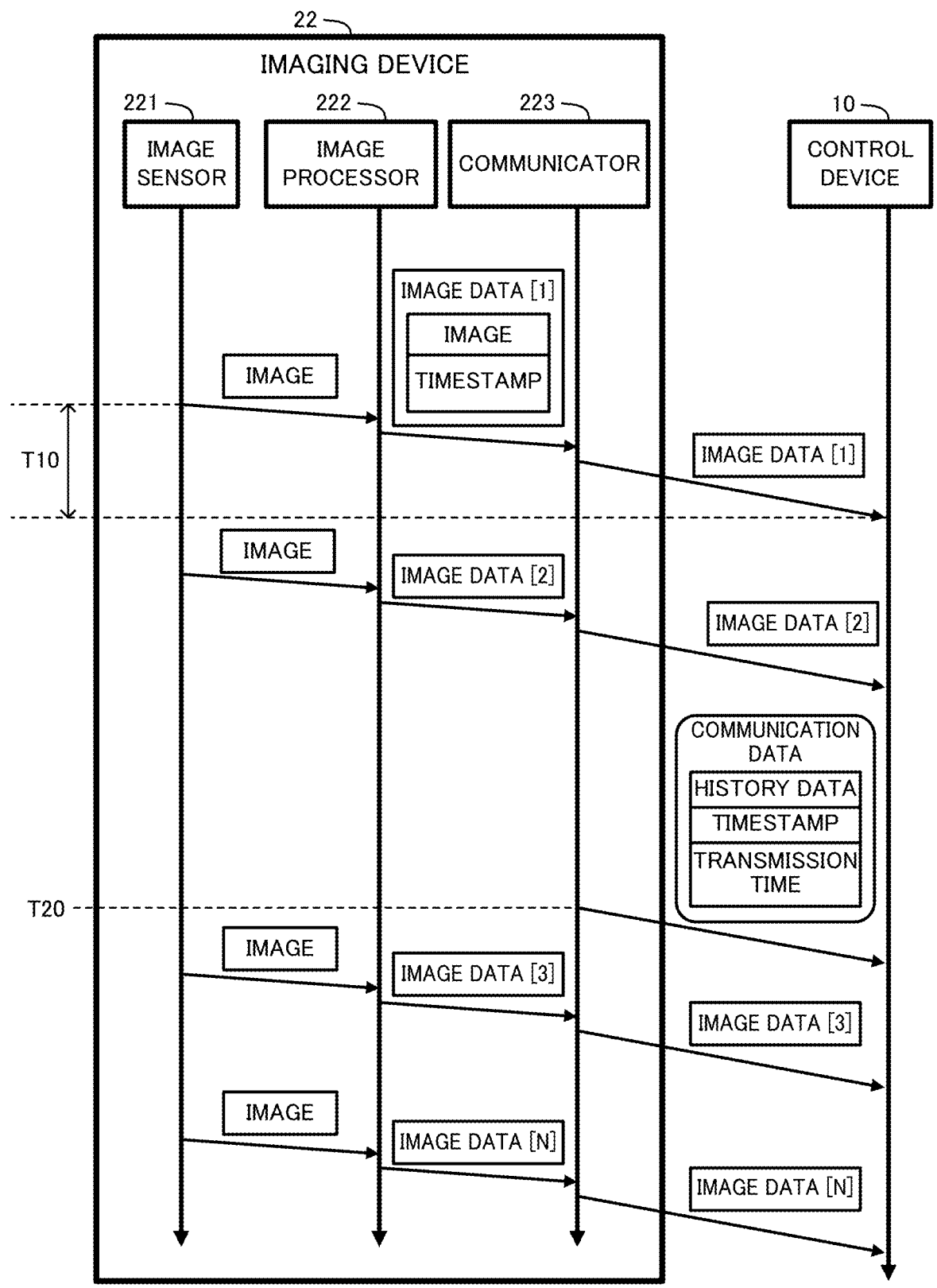
FIG. 2 is a diagram for describing image data and communication data according to Embodiment 1.

The following description is directed to pieces of data transmitted from the imaging device 22 to the control device 10 with reference to FIG. 2. The imaging device 22 includes an image sensor 221 corresponding to the camera, an image processor 222 to process images captured by the image sensor 221, and a communicator 223 to transmit image data indicating the captured images to the control device 10, as illustrated in FIG. 2. The image sensor 221 outputs pieces of image data indicating the repetitively captured images to the image processor 222.

The image processor 222 includes a micro processing unit (MPU), and provides a timestamp to each piece of the image data output from the image sensor 221. The timestamp may be embedded in the image data or accompany the image data as information different from the image data. The image processor 222 repetitively outputs pieces of image data each indicating an image and containing a timestamp to the communicator 223. In FIG. 2, "image data [1]" represents the piece of image data output first, and "image data [N]" represents the piece of image data output in the Nth order. The image processor 222 may also execute another image processing in addition to provision of a timestamp. Examples of another image processing include conversion into a format suitable for communication with the control device 10 and compression.

The timestamp contained in the image data indicates an elapsed time since a specific time in accordance with the format employed in the imaging device 22. The format employed in the imaging device 22 is, for example, a format in terms of the number of clocks in the imaging device 22, a format in the unit of milliseconds, or a format representing the frame number of each of a series of images captured by the imaging device 22 in the form of a video image. The specific time indicates, for example, a time of capture of the first image among a series of images sequentially captured by the image sensor 221, a time of activation of the execution program for the imaging process, or a time of reception of a command to start image capture from the control device 10. The timestamp indicates not an absolute time, such as the world standard time, but a relative time interval between repetitively captured images. The timestamp is provided immediately after output of the image from the image sensor 221 and thus normally corresponds to the time of image capture.

The communicator 223 includes a communication interface circuit to communicate with apparatuses outside the imaging device 22. The communicator 223 repetitively transmits the pieces of image data output from the image processor 222 to the control device 10. The image data is transmitted in accordance with a protocol represented by the real-time transport protocol (RTP). When the image data is transmitted via the communicator 223 to the control device 10, a delay in preparation for transmission and a transmission delay occur in the imaging device 22, as illustrated in FIG. 2, thereby causing a time difference T10 between the actual time of image capture and the time of reception of image data at the control device 10.

The communicator 223 also transmits a piece of communication data related to a history of communication with the control device 10 in parallel to the repetitive transmission of pieces of image data to the control device 10. The communication data contains history data indicating statistics of past communication statuses, a timestamp provided in the same format as that of the timestamp of the image data, and transmission time data indicating a transmission time of transmission of this communication data.

The history data indicates the total number of packets that have been transmitted to the control device 10 or the total amount of payload of the packets, for example. The history data is not limited to these examples and may be other statistic information on communication statuses. For example, even when a piece of image data is lost on the transmission line leading to the control device 10 due to congestion, the following pieces of image data are sequentially transmitted because of the significance of realtimeness in the image data. The history data is used to confirm how much such image data has been received at the control device 10.

The timestamp contained in the communication data indicates an elapsed time since the same specific time in the same format as those of the timestamp contained in the image data. The timestamp contained in the image data is hereinafter referred to as "first timestamp" as appropriate, and the timestamp contained in the communication data is hereinafter referred to as "second timestamp" as appropriate. The second timestamp indicates an elapsed time since the specific time, which is also used as the reference time for the first timestamp, until the time point of provision of this second timestamp, and implies a time interval relative to the first timestamp. The time point of provision of the second timestamp is equal to the transmission time indicated by the transmission time data.

The transmission time indicated by the transmission time data is an absolute time common between the imaging device 22 and the control device 10. The transmission time is represented in a format in the unit of microseconds in accordance with a time synchronization protocol represented by the network time protocol (NTP) or the precision time protocol (PTP), for example.

The communication data is provided with the second timestamp and the transmission time data, in order to clarify that the history indicated by the history data is a history until the time point of transmission of the communication data. That is, the control device 10 is notified of a time T20 of transmission of communication data in FIG. 2 in the two manners, that is, the second timestamp and the transmission time. Alternatively, a communication delay may be estimated by transmitting and receiving a packet containing the transmission time data between the imaging device 22 and the control device 10.

The timing of transmission of communication data is arbitrarily determined. For example, the imaging device 22 may transmit communication data in response to a request from the control device 10, or spontaneously transmit communication data at regular intervals. The communication data is transmitted in accordance with a protocol represented by the RTP control protocol (RTCP).

Referring back to FIG. 1, the control device 10 is a PLC to execute control processes defined by a control program 111 provided from a user and thereby control the control-target machine 21 and run the production line. The control device 10 includes an execution unit 11 to execute the control program 111, the input/output unit 12 to communicate with the control-target machine 21, and the image recording unit 13 to record image data received from the imaging device 22. Each of the execution unit 11, the input/output unit 12, and the image recording unit 13 is a module attachable to and detachable from a base unit, which is not illustrated, including system buses 101. The execution unit 11, the input/output unit 12, and the image recording unit 13 output signals via the system buses 101 to each other. The execution unit 11 corresponds to a so-called central processing unit (CPU), and the input/output unit 12 corresponds to a so-called I/O unit.

Figure 3:
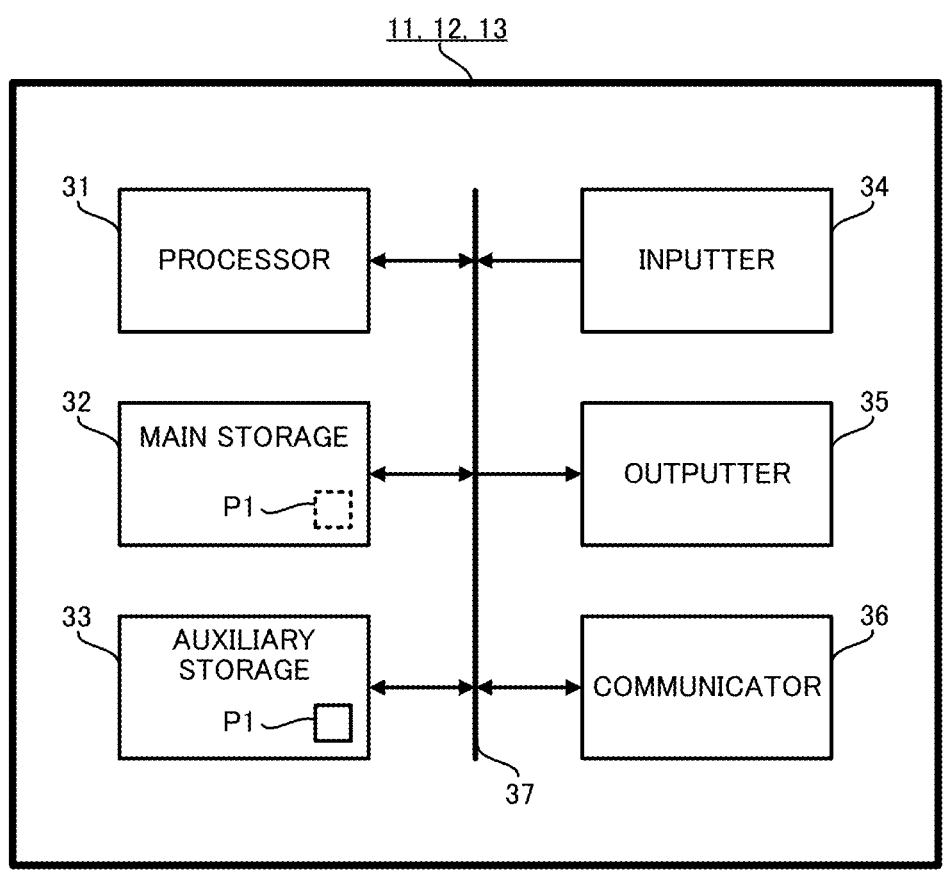
FIG. 3 illustrates a hardware configuration of each of an execution unit, an input/output unit, and an image recording unit according to Embodiment 1.

FIG. 3 illustrates a hardware configuration of each of the execution unit 11, the input/output unit 12, and the image recording unit 13. As illustrated in FIG. 3, each of the execution unit 11, the input/output unit 12, and the image recording unit 13 includes a processor 31, a main storage 32, an auxiliary storage 33, an inputter 34, an outputter 35, and a communicator 36. The main storage 32, the auxiliary storage 33, the inputter 34, the outputter 35, and the communicator 36 are each connected to the processor 31 via internal buses 37.

The processor 31 includes a central processing unit (CPU) or a micro processing unit (MPU). The processor 31 executes a program P1 stored in the auxiliary storage 33 and thereby performs various functions and executes processes described below.

The main storage 32 includes a random access memory (RAM). The program P1 is loaded from the auxiliary storage 33 into the main storage 32. The main storage 32 serves as a work area of the processor 31.

The auxiliary storage 33 includes a non-volatile memory, represented by an electrically erasable programmable read-only memory (EEPROM) or hard disk drive (HDD). The auxiliary storage 33 stores the program P1 and various types of data used in processes in the processor 31. The auxiliary storage 33 provides the processor 31 with data to be used in the processor 31 under the instructions from the processor 31. The auxiliary storage 33 also stores data fed from the processor 31.

The inputter 34 includes an input device represented by a hardware switch or input key. The inputter 34 acquires information input from the user and outputs the acquired information to the processor 31.

The outputter 35 includes an output device represented by a light emitting diode (LED), liquid crystal display (LCD), or speaker. The outputter 35 presents various types of information to the user under the instructions from the processor 31.

The communicator 36 includes a network interface circuit to communicate with external apparatuses. The communicator 36 receives signals from the outside and outputs data indicated by the signals to the processor 31. The communicator 36 also transmits signals indicating the data output from the processor 31 to external apparatuses. Although FIG. 3 illustrates a representative communicator 36, this configuration is a mere example. The image recording unit 13 may include a communicator 36 to communicate with the execution unit 11 and another communicator 36 to communicate with the imaging device 22 separately, for example.

Figure 4:
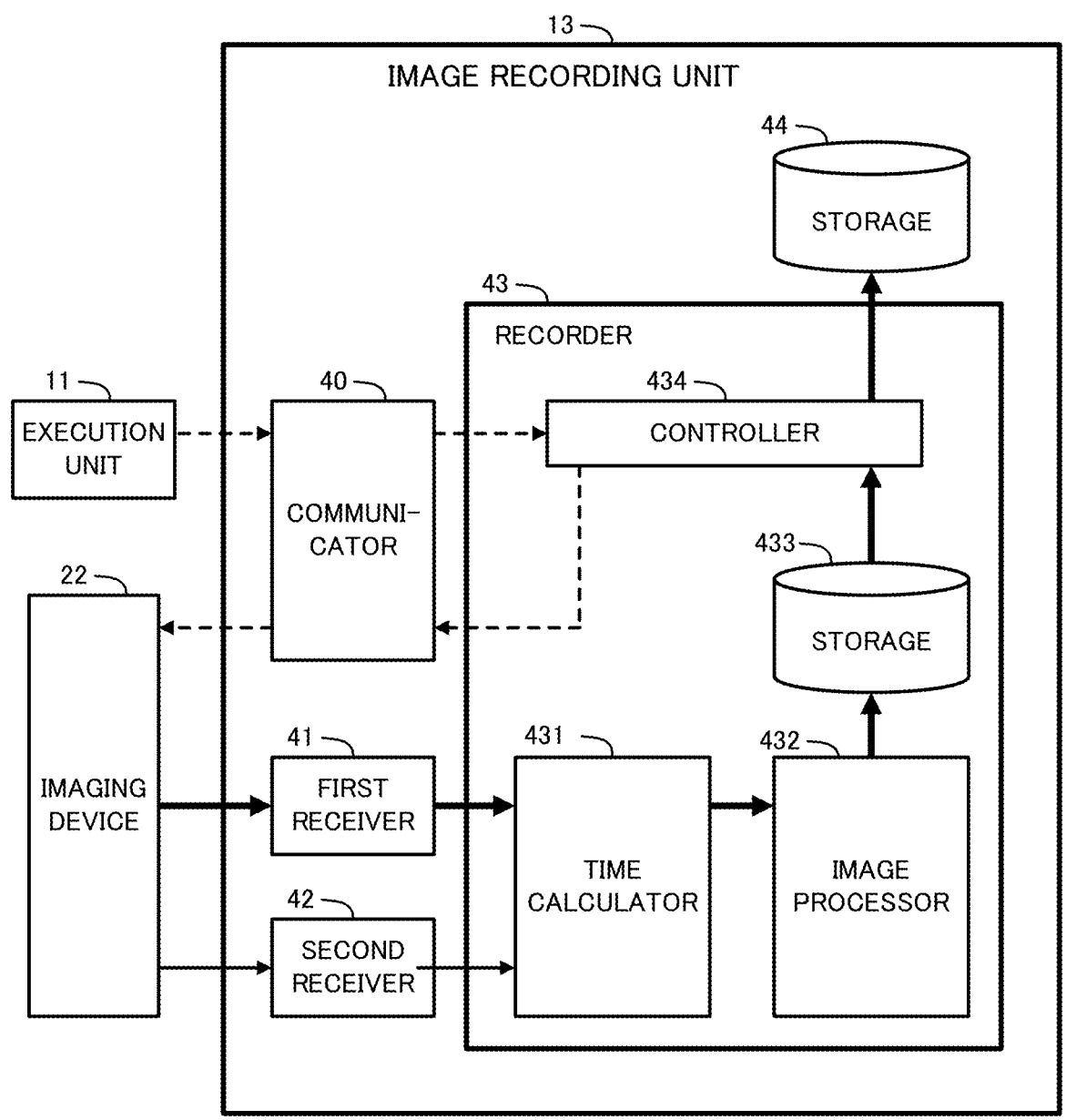
FIG. 4 illustrates a functional configuration of the image recording unit according to Embodiment 1.

The hardware components illustrated in FIG. 3 cooperate with each other and thereby allow the image recording unit 13 of the control device 10 to perform functions illustrated in FIG. 4. In detail, the image recording unit 13 has a functional configuration including a communicator 40 to execute communication for time synchronization with the execution unit 11 and the imaging device 22, a first receiver 41 to receive image data transmitted from the imaging device 22, a second receiver 42 to receive communication data transmitted from the imaging device 22, a recorder 43 to cause a storage 44 to store association data, in which a system time corresponding to the timestamp is associated with the captured image, and the storage 44 in which the association data is stored. In FIG. 4, the dashed-line arrows indicate transmission of data for time synchronization, the thick solid arrows indicate transmission of data on images, and thin solid arrows indicate transmission of transmission time data contained in the communication data.

The communicator 40 is mainly achieved by cooperation of the processor 31 and the communicator 36. The communicator 40 transmits and receives time synchronization data for allowing individual devices involved in the control system 100 to synchronize the system time common between the devices, in accordance with a protocol represented by the NTP or PTP. In detail, the communicator 40 receives time synchronization data from the execution unit 11 and outputs the time synchronization data to a controller 434, and thereby synchronizes the system time managed in the execution unit 11 and the system time managed in the image recording unit 13. The communicator 40 also receives time synchronization data from the controller 434 and transmits the time synchronization data to the imaging device 22, and thereby synchronizes the system time managed in the image recording unit 13 and the system time managed in the imaging device 22.

The first receiver 41 is mainly achieved by cooperation of the processor 31 and the communicator 36. The first receiver 41 receives pieces of image data repetitively transmitted from the imaging device 22 and outputs the received image data to the recorder 43. The first receiver 41 corresponds to an example of first reception means, in the control device 10, for repetitively receiving pieces of image data each indicating an image captured by an imaging device and related to control of a control-target machine, and containing a first timestamp indicating an elapsed time since a specific time in association with the image.

The second receiver 42 is mainly achieved by cooperation of the processor 31 and the communicator 36. The second receiver 42 receives a piece of communication data transmitted from the imaging device 22 and outputs the received communication data to the recorder 43. The second receiver 42 corresponds to an example of second reception means, in the control device 10, for receiving a piece of communication data that is related to a history of communication at the imaging device and contains a second timestamp indicating an elapsed time since the specific time and a piece of transmission time data indicating a transmission time of transmission of the communication data.

The recorder 43 generates a piece of association data in which the image indicated by a piece of image data received at the first receiver 41 is associated with a corresponding time corresponding to the first timestamp associated with the image, and causes the storage 44 to store the generated association data. The corresponding time is represented in the same format as the system time managed in the image recording unit 13. The recorder 43 corresponds to an example of recording means, in the control device 10, for causing storage means to store a piece of association data, indicating a corresponding time corresponding to the first timestamp in association with the image, on the basis of comparison between the first timestamp associated with the image indicated by the image data and the second timestamp corresponding to the transmission time. The recorder 43 includes a time calculator 431 to calculate a corresponding time from the first timestamp and the second timestamp and provide the corresponding time to an image, an image processor 432 to process the image, a storage 433 to temporarily retain pieces of association data in which the image is associated with the corresponding time, and the controller 434 to extract pieces of association data that satisfy conditions from the storage 433 and causes the storage 44 to store the pieces of association data.

The time calculator 431 is mainly achieved by the processor 31. The time calculator 431 reads the first timestamp from each piece of image data acquired via the first receiver 41, reads the second timestamp from the piece of communication data acquired via the second receiver 42, and then compares the first timestamp and the second timestamp. In detail, the time calculator 431 calculates a difference by subtracting the elapsed time indicated by the second timestamp from the elapsed time indicated by the first timestamp. The time calculator 431 adds the calculated difference to the transmission time read from the communication data, and thereby obtains the corresponding time corresponding to the first timestamp. The time calculator 431 then generates a piece of association data by associating the calculated corresponding time with the image indicated by the piece of image data, and outputs the generated association data to the image processor 432.

In the case where the unit of the first and second timestamps differs from the unit of the transmission time indicated by the transmission time data, the time calculator 431 unifies the units and then calculates a corresponding time. In an exemplary case where the first and second timestamps are represented in terms of the number of clocks while the transmission time is the system time in the unit of seconds, the time calculator 431 converts the unit of the difference between the first and second timestamps into the unit of seconds by multiplying the difference by the clock period or dividing the difference by the clock frequency, and then adds the difference to the transmission time and obtains a corresponding time.

Figure 5:
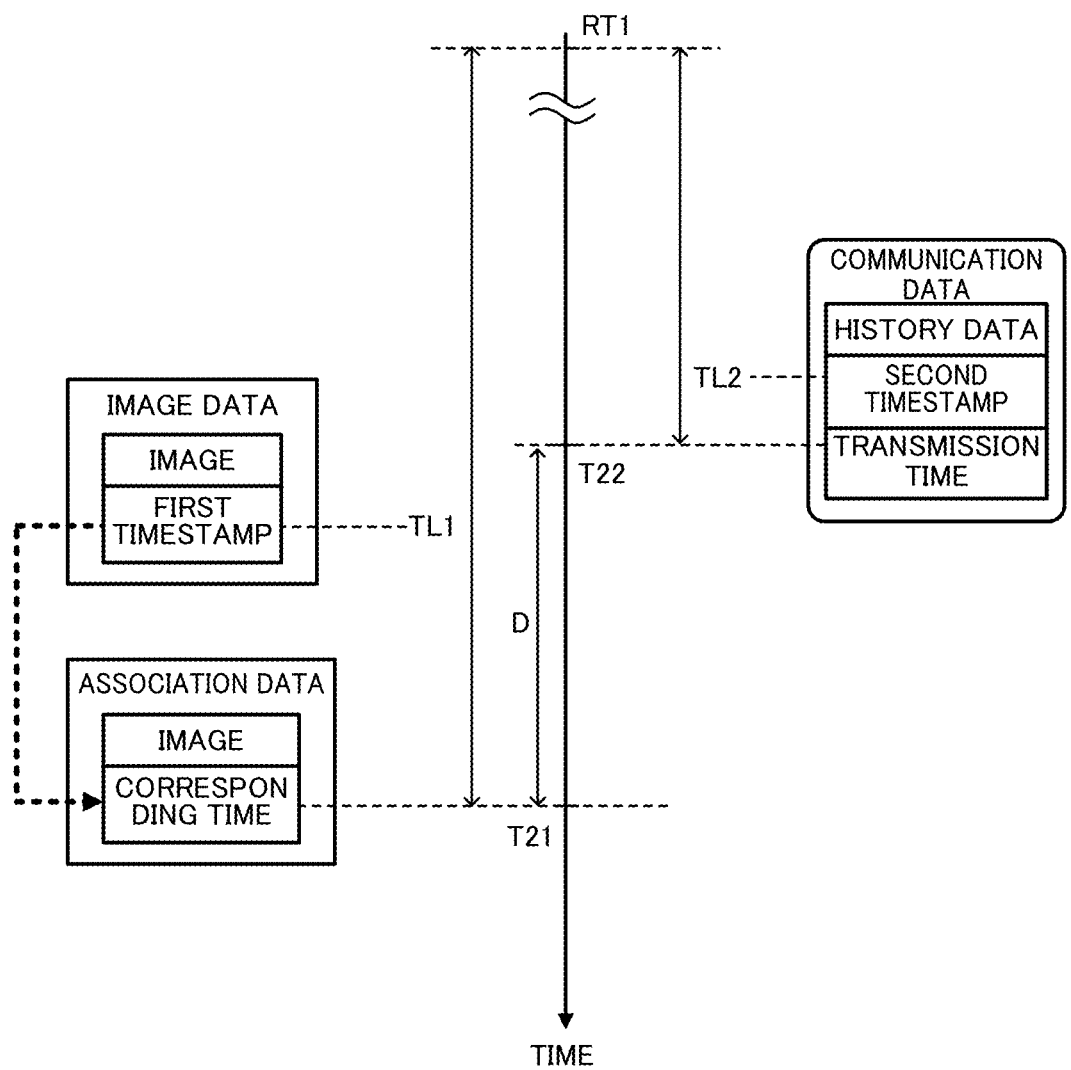
FIG. 5 is a diagram for describing a corresponding time according to Embodiment 1.

FIG. 5 is a schematic diagram illustrating the corresponding time calculated at the time calculator 431. As illustrated in FIG. 5, the second timestamp of the communication data indicates a time length TL2 from a reference time RT1 until a transmission time T22, and the first timestamp of the image data indicates a time length TL1 from the time RT1. The time calculator 431 calculates a difference D by subtracting the second timestamp from the first timestamp, adds the difference D to the transmission time T22, and thus obtains a corresponding time T21 and generates a piece of association data.

The time calculator 431 temporarily holds sequentially acquired pieces of image data until acquisition of apiece of communication data. When acquiring apiece of communication data, the time calculator 431 calculates a corresponding time for each of the held pieces of image data and pieces of image data that are subsequently acquired, and generates pieces of association data. In the case of acquisition of pieces of communication data multiple times, the time calculator 431 may generate pieces of association data on the basis of the latest piece of communication data.

The image processor 432 is mainly achieved by the processor 31. The image processor 432 converts the format of the association data into a format suitable for being viewed in follow-up investigation or a format suitable for being stored in the storages 433 and 44. The process of format conversion may involve data compression.

The storage 433 is mainly achieved by the main storage 32. The pieces of association data after format conversion at the image processor 432 are sequentially stored into the storage 433. When the volume of the stored association data reaches the capacity of the storage 433, older pieces of the stored association data are sequentially overwritten in the chronological order by newly acquired pieces of association data. The storage 433 corresponds to a first example of storage means, in the control device 10, in which pieces of association data are stored.

The controller 434 is mainly achieved by the processor 31. At a timing of satisfaction of the condition that a trigger signal is received from the outside, the controller 434 reads the pieces of association data indicating the corresponding times before and after the timing from the storage 433 and causes the storage 44 to store the read pieces of association data. In an exemplary case of reception of a trigger signal indicating that an error occurs during running of the production line, the controller 434 copies the pieces of association data containing the corresponding times from a time three minutes before the timing of reception of the trigger signal until a time one minute after the timing, from the storage 433 into the storage 44. The controller 434 is responsible for overall control of the components of the image recording unit 13 and management of the system time.

The storage 44 is mainly achieved by the auxiliary storage 33. While the storage 433 serves as a ring buffer to temporarily retain pieces of association data, the storage 44 retains images around the timing of reception of a trigger signal that implies possibility of any abnormality, for a relatively long period in preparation for follow-up investigation. The storage 44 corresponds to a second example of the storage means, in the control device 10, in which pieces of association data are stored.

Figure 6:
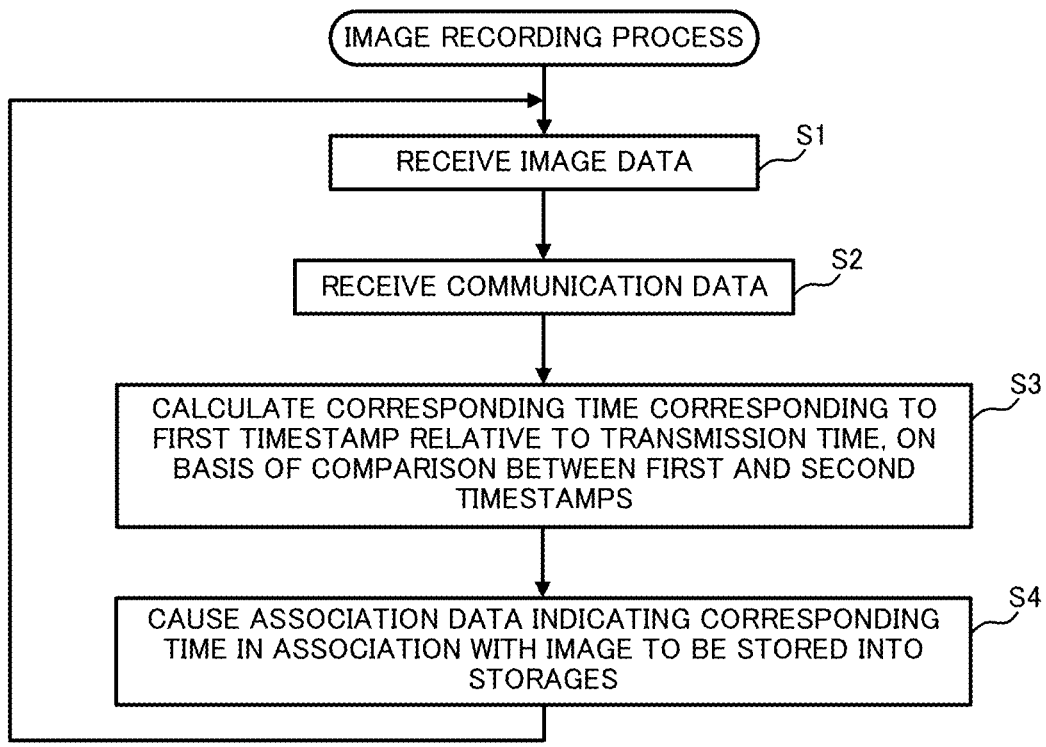
FIG. 6 is a flowchart illustrating an image recording process according to Embodiment 1.

The following description is directed to an image recording process executed in the control device 10 with reference to FIG. 6. The image recording process illustrated in FIG. 6 is initiated in response to activation of the image recording unit 13. The process illustrated in FIG. 6 is a mere example aiming at facilitating an understanding of the description, and may be replaced with another image recording process different from that in FIG. 6.

In the image recording process, the first receiver 41 receives a piece of image data from the imaging device 22 (Step S1). Step S1 corresponds to an example of a step, in the image recording method executed in the control device 10, of receiving by the first reception means a piece of image data. The second receiver 42 then receives a piece of communication data from the imaging device 22 (Step S2). Step S2 corresponds to an example of a step, in the image recording method executed in the control device 10, of receiving by the second reception means a piece of communication data. When receiving no communication data, the image recording unit 13 may wait until reception of communication data.

The time calculator 431 of the recorder 43 then calculates a corresponding time corresponding to the first timestamp relative to the transmission time, on the basis of comparison between the first timestamp of in the piece of image data received in Step S1 and the second timestamp of the piece of communication data received in Step S2 (Step S3). Step S3 corresponds to a step, in the image recording method executed in the control device 10, of causing by the recording means the storage means to store a piece of association data. In an exemplary case where the timestamps are represented in terms of the number of clocks, the time calculator 431 calculates a corresponding time Tn using Expression (1) below:

$$Tn = Tbase + [(TSn - TSbase)/fclock] \qquad (1)$$

Figure 7:
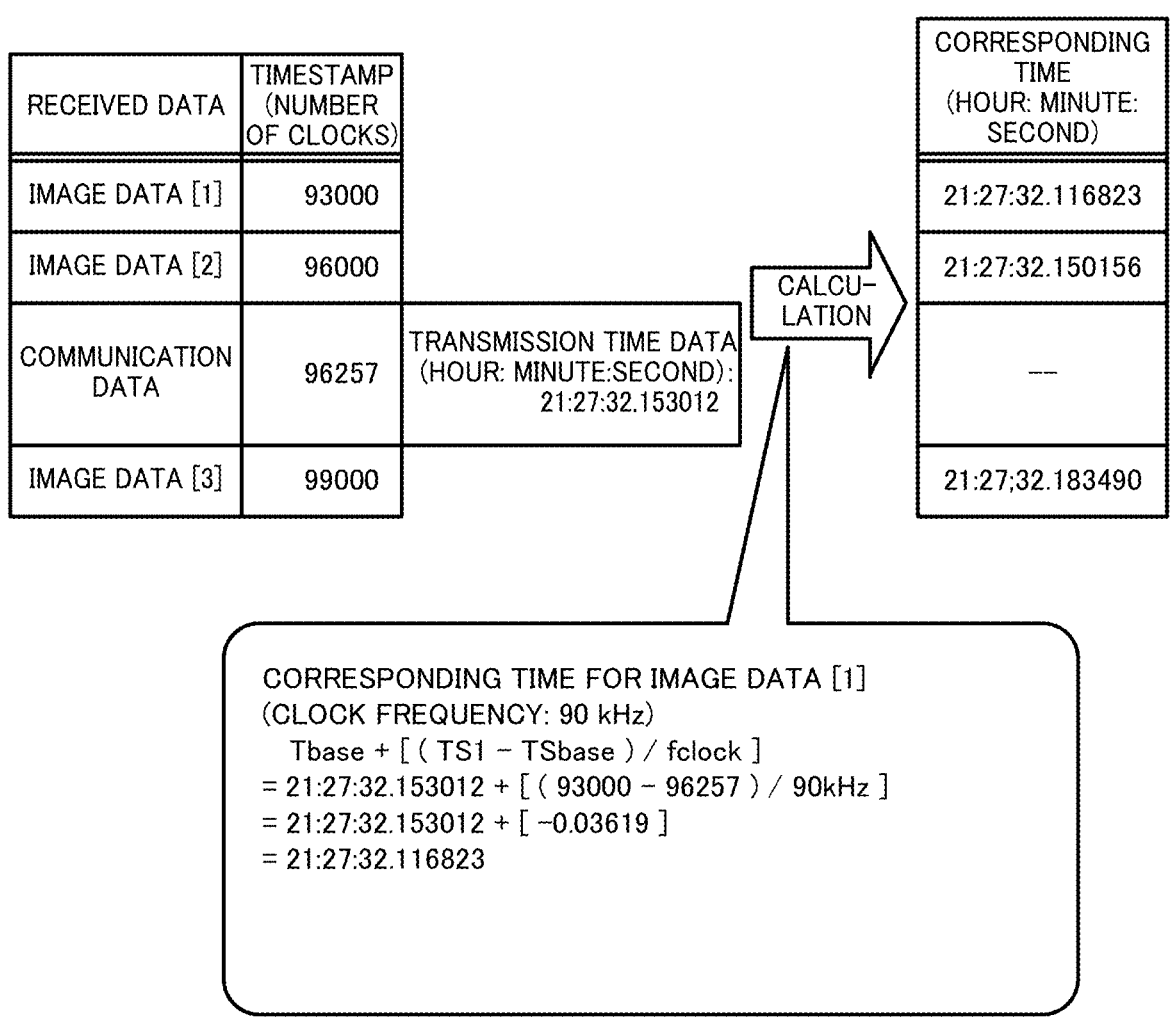
FIG. 7 illustrates an exemplary manner of calculation of the corresponding time according to Embodiment 1.

In this expression, Tbase indicates the transmission time of the communication data, TSbase indicates the second timestamp of the communication data, TSn indicates the first timestamp contained in the image data, and fclock indicates a clock frequency. The clock frequency may be contained in at least either of the image data and the communication data, may be output from the imaging device 22 to the control device 10 as information different from image data or communication data, or may be predetermined as a parameter common between the imaging device 22 and the control device 10. FIG. 7 illustrates a corresponding time calculated in an example in which the clock frequency is 90 kHz.

The recorder 43 then causes the storage 433 and the storage 44 to store pieces of association data indicating the corresponding time in association with the images (Step S4). In detail, the image processor 432 sequentially causes the storage 433 to store pieces of association data, and the controller 434 copies some of the pieces of association data from the storage 433 into the storage 44 as required. The image recording unit 13 then repeats Step S1 and the following steps. Once communication data has been received, the image recording unit 13 may skip Step S2.

As described above, the first receiver 41 receives pieces of image data each containing a first timestamp, the second receiver 42 receives a piece of communication data containing a second timestamp, and the recorder 43 causes the storage 433 and the storage 44 to store pieces of association data, each indicating a corresponding time corresponding to the first timestamp in association with the image, on the basis of comparison between the first timestamp and the second timestamp. The image is thus provided with the corresponding time corresponding to the first timestamp, which was preliminarily provided before reception at the first receiver 41. This configuration can thus provide more convenient times to data on images acquired by the control device 10 from the outside without being affected by communication delays.

Specifically, the configuration provides an image with a corresponding time closer to the actual timing of image capture, and is therefore expected to prevent the user from mistaking the time of occurrence of a trouble recorded in the image. The corresponding time is represented in terms of the system time common to the control device 10, and can thus facilitate alignment of the image with data logged in the control device 10. The image provided with the corresponding time can therefore have improved convenience.

Furthermore, the recorder 43 calculates a difference by subtracting the elapsed time indicated by the second timestamp from the elapsed time indicated by the first timestamp, adds the calculated difference to the transmission time indicated by the communication data, and thereby obtains a corresponding time. The corresponding time can thus be calculated with a low calculation load.

Embodiment 2

Embodiment 2 is described below focusing on the differences from Embodiment 1 described above. The components identical or corresponding to those in the above-described embodiment are provided with the same reference symbol without redundant description or with simplified description. Embodiment 1 is directed to an example, in which a first timestamp is provided at the timing of image capture at the imaging device 22 and corresponds to the time of image capture. The imaging device 22 of another model, however, may provide a first timestamp a certain period after the time of image capture in some cases. The corresponding time provided to an image in the control device 10 is preferably close to the time of image capture. The following description is directed to an example, in which when the first timestamp provided by the imaging device 22 corresponds to a time different from the time of image capture, an image is provided with a corresponding time closer to the time of image capture.

Figure 8:
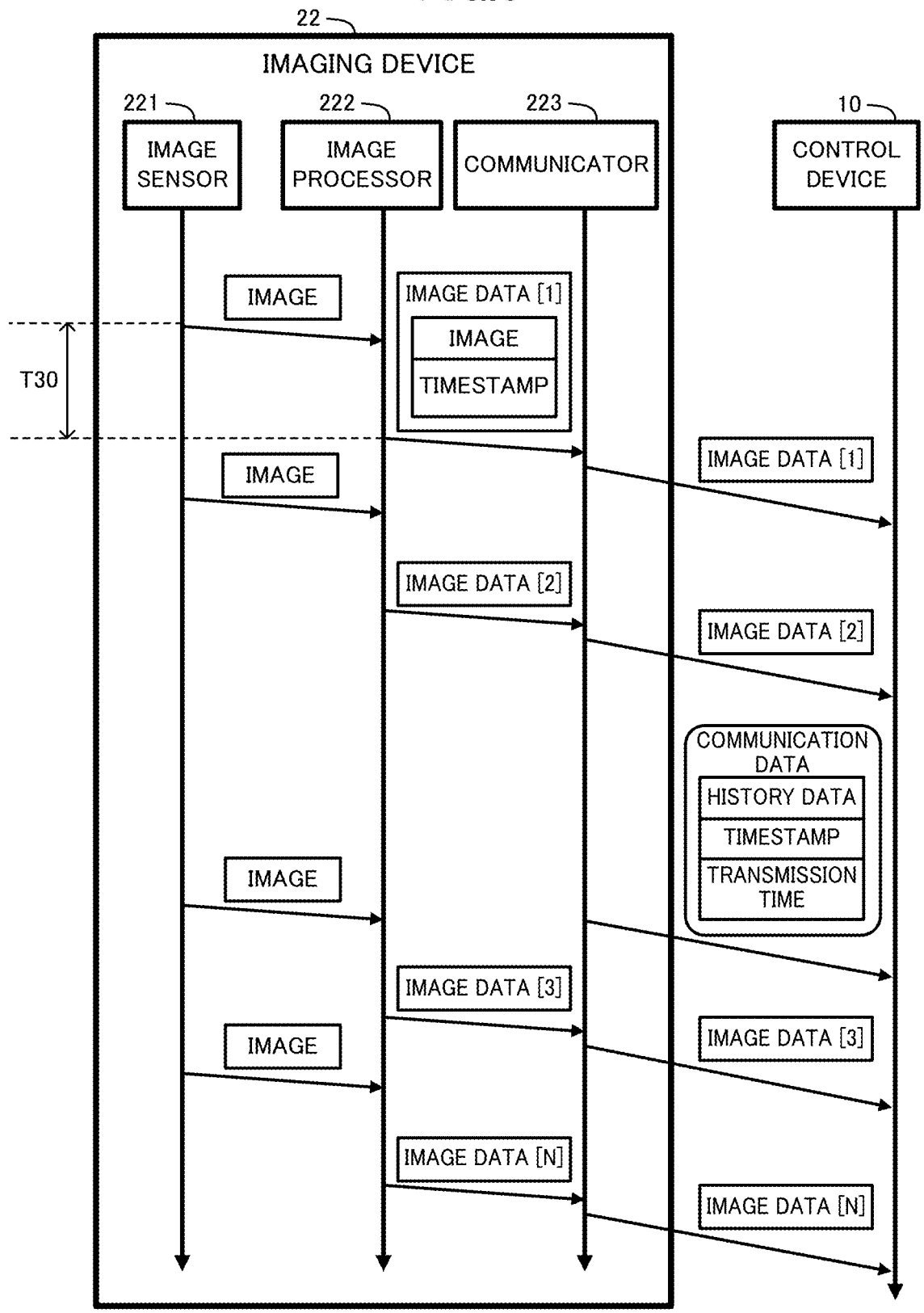
FIG. 8 illustrates a timestamp provided to an image according to Embodiment 2.

FIG. 8 illustrates an example in which the image processor 222 of the imaging device 22 acquires an image from the image sensor 221, processes the image for a relatively long period, and then outputs a piece of image data provided with a timestamp. FIG. 8 reveals that the time corresponding to the timestamp is later than the time of image capture at the image sensor 221 by a time T30.

In order to compensate for the above-mentioned time difference, the time calculator 431 in this embodiment adds a predetermined correction term in calculation of a corresponding time. In detail, the time calculator 431 adds the difference between the first timestamp and the second timestamp to the transmission time indicated by the communication data, then further adds the correction term to the sum, and thereby obtains a corresponding time. The correction term may be set by the user. Alternatively, the control device 10 may identify the model of the imaging device 22 and select a correction term predetermined for the model. Embodiment 1 described above corresponds to an example in which the correction term is zero.

In an exemplary case where the timestamps are represented in terms of the number of clocks, the time calculator 431 calculates a corresponding time Tn using Expression (2) below:

$$Tn = T\text{base} + [(TSn - TS\text{base})/f\text{clock}] + \alpha \qquad (2)$$

Figure 9:
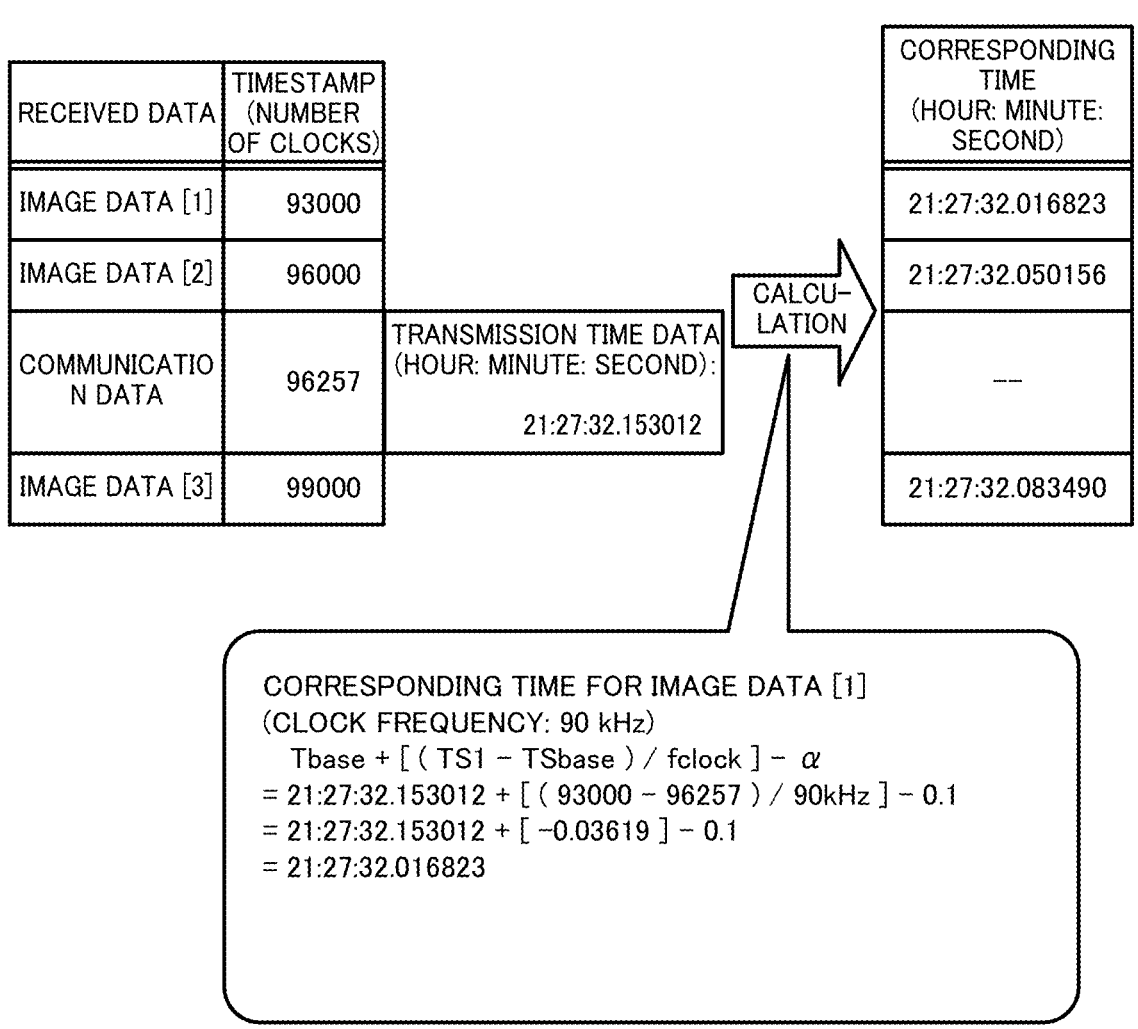
FIG. 9 illustrates an exemplary manner of calculation of a corresponding time according to Embodiment 2.

In this expression, Tbase indicates the transmission time of the communication data, TSbase indicates the second timestamp of the communication data, TSn indicates the first timestamp contained in the image data, fclock indicates a clock frequency, and α indicates a correction term. The correction term α has a negative value when the first timestamp indicates a time later than the actual time of image capture as in the example illustrated in FIG. 8. FIG. 9 illustrates a corresponding time calculated in an example in which the clock frequency is 90 kHz.

As described above, the recorder 43 calculates a corresponding time by adding the correction term. The image can therefore be provided with the corresponding time equal to the actual time of image capture.

Embodiment 3

Embodiment 3 is described below focusing on the differences from Embodiment 1 described above. The components identical or corresponding to those in the above-described embodiments are provided with the same reference symbol without redundant description or with simplified description. The first timestamp and the second timestamp are represented in the identical format in Embodiment 1, but may be represented in different formats in other cases. The following description is directed to an example in which the unit of the first timestamp differs from the unit of the second timestamp.

Figure 10:
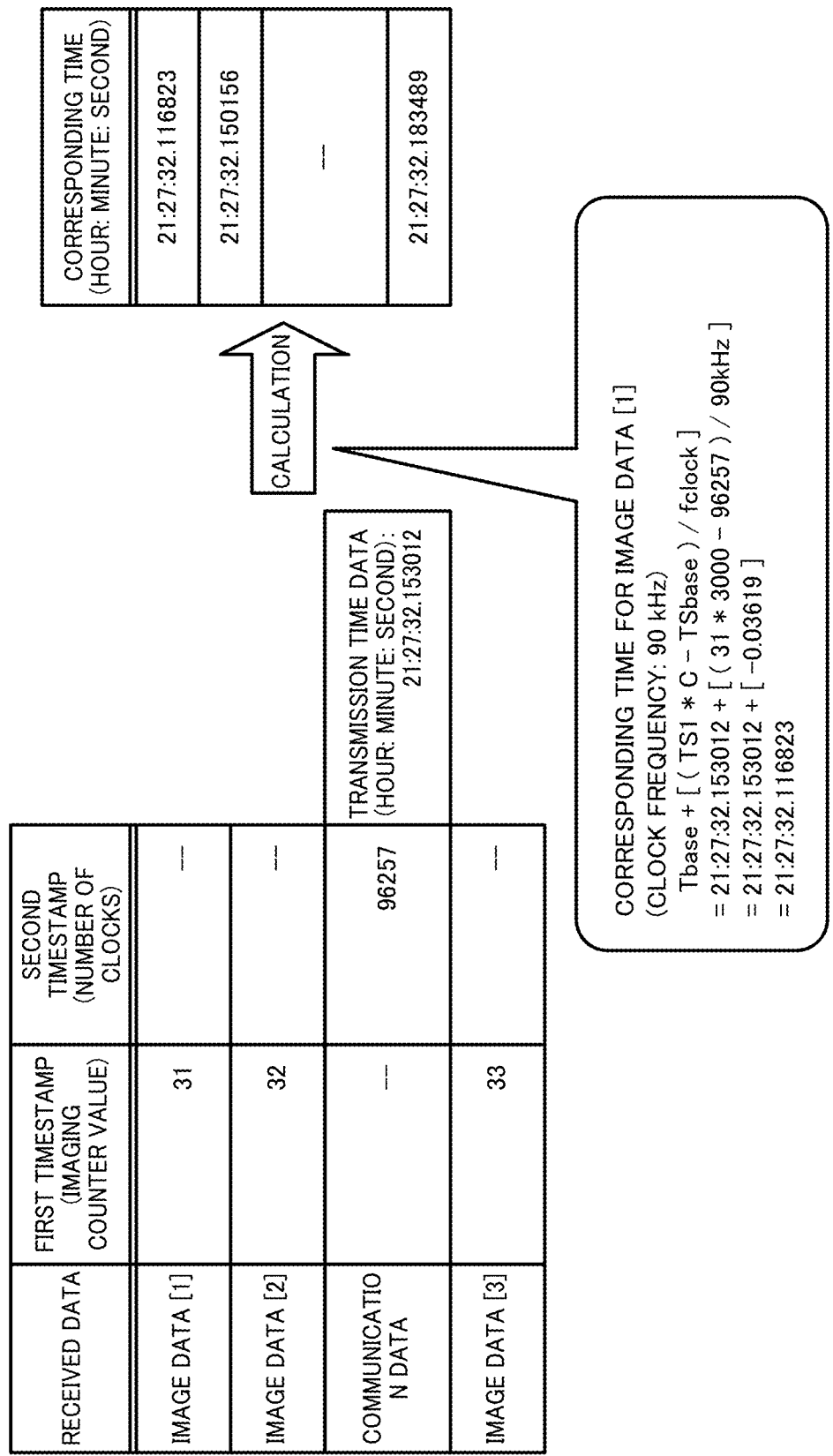
FIG. 10 illustrates an exemplary manner of calculation of a corresponding time according to Embodiment 3.

FIG. 10 illustrates an example in which the first timestamp is an imaging counter value to be incremented in response to every image capture starting from a specific time at certain intervals, while the second timestamp is represented in terms of the number of clocks like that in Embodiment 1. In this example, the time calculator 431 calculates a corresponding time Tn on the basis of the number C of clocks equal to the cycle of image capture, using Expression (3) below:

$$Tn = T\text{base} + [(TSn*C - TS\text{base})/f\text{clock}] \qquad (3)$$

FIG. 10 illustrates an exemplary manner of calculation of a corresponding time in the case of the cycle of image capture equal to 3,000 clocks.

The number C of clocks in Expression (3) is an exemplary parameter aimed at unifying the units of the first timestamp and the second timestamp. This parameter may be preliminarily set by the user. Alternatively, the image recording unit 13 may output an inquiry to the imaging device 22 and thus acquire the parameter.

As described above, the first timestamp may be information indicating an elapsed time in a format different from that of the second timestamp.

The above-described embodiments of the present disclosure are not to be construed as limiting the scope of the present disclosure.

Figure 11:
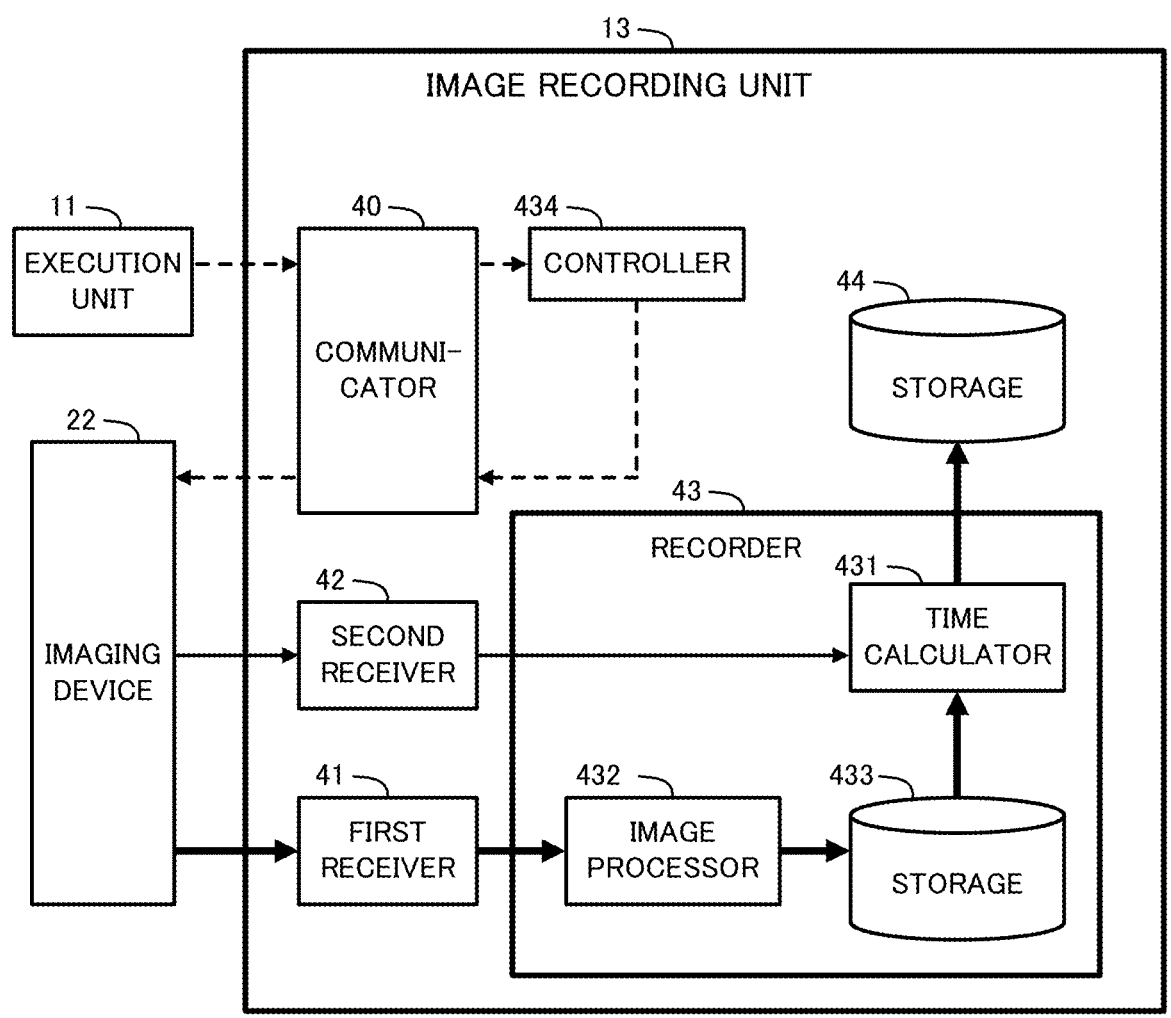
FIG. 11 is a first diagram illustrating a functional configuration of an image recording unit according to a modification.

For example, the functional configuration of the image recording unit 13 illustrated in FIG. 4 is a mere example and may be arbitrarily modified. FIG. 11 illustrates another configuration of the image recording unit 13. As illustrated in FIG. 11, the image data received at the first receiver 41 may be processed at the image processor 432 and then stored into the storage 433, and the time calculator 431 may cause the storage 44 to store association data on the basis of the image data read from the storage 433 and the communication data received at the second receiver 42. The controller 434 may instruct the time calculator 431 to calculate a corresponding time at the timing of reception of a trigger signal.

Although the recorder 43 provides a corresponding time to each of sequentially acquired images in the above-described embodiments, this configuration is a mere example. The recorder 43 is only required to add the first timestamp to at least one piece of association data and cause the storage 433 or the storage 44 to store the association data while causing the storage 433 or the storage 44 to store other pieces of image data as they are. The recorder 43 in this case can also obtain a corresponding time corresponding to the timestamp of each piece of image data as required.

Figure 12:
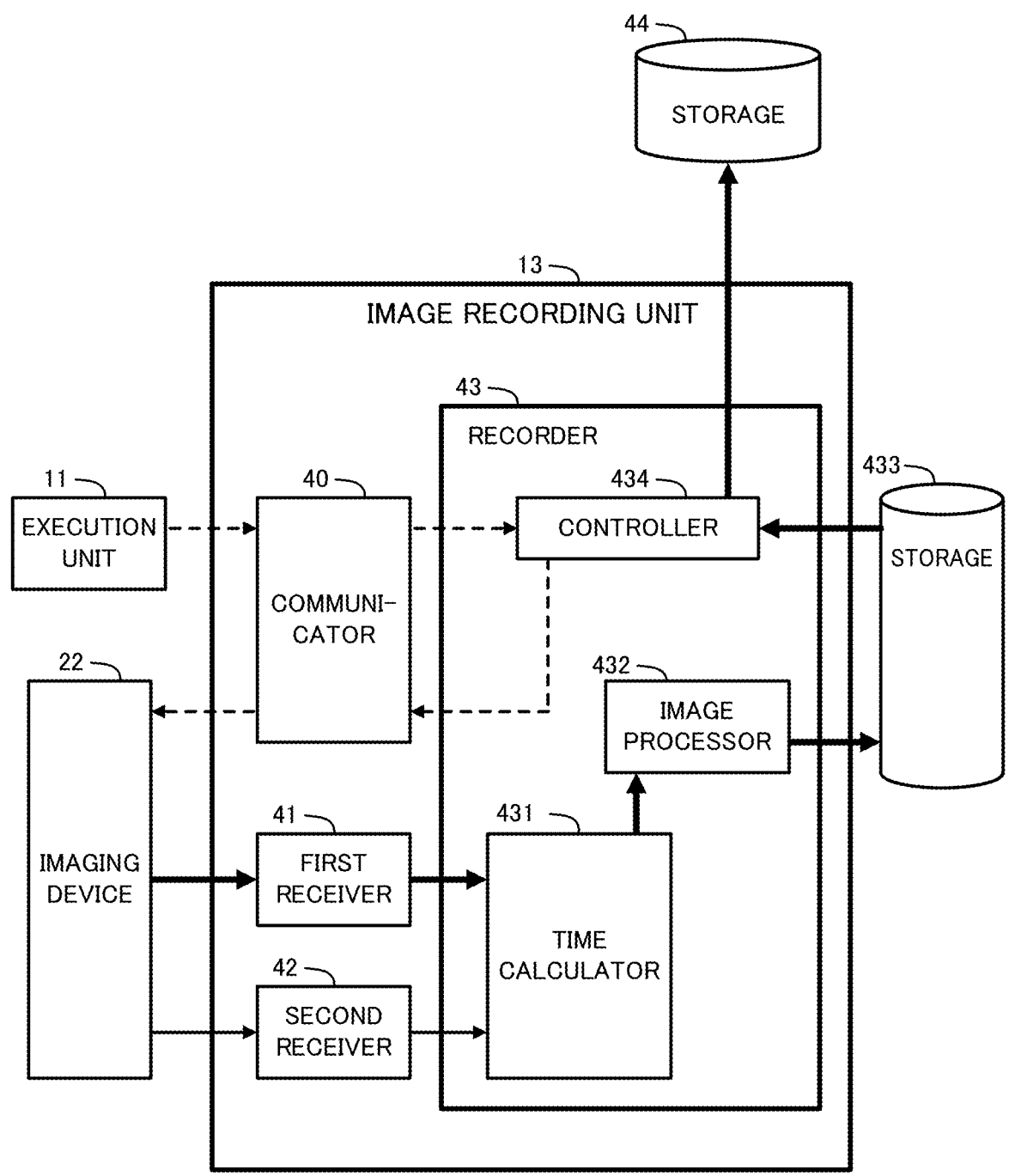
FIG. 12 is a second diagram illustrating a functional configuration of an image recording unit according to another modification.

Alternatively, the image recording unit 13 may exclude the storages 433 and 44, as illustrated in FIG. 12. In the example illustrated in FIG. 12, association data is stored in the storages 433 and 44, which are external server apparatuses or attachable and detachable non-transitory recording media. The controller 434 may instruct the storage 433 to transfer association data to the storage 44, without reading the association data from the storage 433.

Although the control device 10 includes the execution unit 11, the input/output unit 12, and the image recording unit 13 in the above-described embodiments, the control device 10 may further include another unit. Alternatively, hardware components to achieve the functions of multiple units may be accommodated in a single housing and used as a control device to achieve the functions.

The control system 100 is not necessarily a system to run a production line and may be another system involving a processing line or inspection line or a system for process control in a plant.

The functions of the control device 10 may be achieved by dedicated hardware or an ordinal computer system.

For example, the program P1 to be executed at the processor 31 may be stored in a non-transitory computer-readable recording medium for distribution and then installed in a computer to configure a device for performing the above-described processes. Conceivable examples of such a non-transitory recording medium include a flexible disk, a compact disc read-only memory (CD-ROM), a digital versatile disc (DVD), and a magneto-optical disc (MO).

The program P1 may also be stored in a disk drive included in a server apparatus on a communication network represented by the Internet, and may be downloaded into a computer by being superimposed on a carrier wave, for example.

Alternatively, the program P1 may be activated while being transferred through a communication network to perform the above-described processes.

A server apparatus may execute all or part of the program P1 and a computer may execute the program P1 while transmitting and receiving information on the executed processes to and from the server apparatus via a communication network, to perform the above-described processes.

In the case where the above-described functions are achieved by an operating system (OS) or by cooperation of the OS and applications, only the components other than the OS may be stored in a non-transitory medium for distribution or downloaded into a computer, for example.

The functions of the control device 10 may also be performed by means other than software. Part or all of the functions may be performed by dedicated hardware including circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for a system that controls machines and records images.

REFERENCE SIGNS LIST

100 Control system
10 Control device
11 Execution unit
12 Input/output unit
13 Image recording unit
101 System bus
21 Control-target machine
22 Imaging device
221 Image sensor
222 Image processor
223 Communicator
31 Processor
32 Main storage
33 Auxiliary storage
34 Inputter
35 Outputter
36 Communicator
37 Internal bus
40 Communicator
41 First receiver
42 Second receiver
43 Recorder
431 Time calculator
432 Image processor
433 Storage
434 Controller
44 Storage
P1 Program

The invention claimed is:

1. A control device connectable to a control-target machine and an imaging device to control the control-target machine, the control device comprising:
a first receiver circuitry to repetitively receive pieces of image data each indicating an image captured by the imaging device and related to control of the control-target machine, the piece of image data containing a first timestamp indicating an elapsed time since a specific time in association with the image;
a second receiver circuit to receive a piece of communication data related to a history of communication at the imaging device, the piece of communication data containing a second timestamp indicating an elapsed time since the specific time and a piece of transmission time data indicating a transmission time of transmission of the piece of communication data; and
processing circuitry to cause a storage to store a piece of association data indicating a corresponding time in association with the image, the corresponding time corresponding to the first timestamp and being calculated by subtracting the elapsed time indicated by the second timestamp from the elapsed time indicated by the first timestamp and then adding a difference resulting from the subtraction to the transmission time, the first timestamp being associated with the image indicated by the image data, the second timestamp corresponding to the transmission time, or being calculated by adding a predetermined correction term to a result of the addition, the predetermined correction term compensating for a time difference between a time corresponding to the first timestamp and a time of image capture at the imaging device.

2. The control device according to claim 1, wherein the transmission time is in a format of one of a network time protocol (NTP) or a precision time protocol (PTP).

3. An image recording method, comprising:
receiving a piece of image data indicating an image captured by an imaging device, the piece of image data containing a first timestamp indicating an elapsed time since a specific time in association with the image;
receiving a piece of communication data related to a history of communication at the imaging device, the piece of communication data containing a second timestamp indicating an elapsed time since the specific time and a piece of transmission time data indicating a transmission time of transmission of the piece of communication data; and
causing a storage to store a piece of association data indicating a corresponding time in association with the image, the corresponding time corresponding to the first timestamp and being calculated by subtracting the elapsed time indicated by the second timestamp from the elapsed time indicated by the first timestamp and then adding a difference resulting from the subtraction to the transmission time, the first timestamp being associated with the image indicated by the image data, the second timestamp corresponding to the transmission time, or being calculated by adding a predetermined correction term to a result of the addition, the predetermined correction term compensating for a time difference between a time corresponding to the first timestamp and a time of image capture at the imaging device.

4. A non-transitory computer-readable recording medium storing a program that, when executed by a computer that connects to an imaging device, causes the computer to perform a method comprising:
receiving a piece of image data indicating an image captured by the imaging device, the piece of image data containing a first timestamp indicating an elapsed time since a specific time in association with the image;
receiving a piece of communication data related to a history of communication at the imaging device, the piece of communication data containing a second timestamp indicating an elapsed time since the specific time and a piece of transmission time data indicating a transmission time of transmission of the piece of communication data; and
causing a storage to store a piece of association data indicating a corresponding time in association with the image, the corresponding time corresponding to the first timestamp and being calculated by subtracting the elapsed time indicated by the second timestamp from the elapsed time indicated by the first timestamp and then adding a difference resulting from the subtraction to the transmission time, the first timestamp being associated with the image indicated by the image data, the second timestamp corresponding to the transmission time, or being calculated by adding a predetermined correction term to a result of the addition, the predetermined correction term compensating for a time difference between a time corresponding to the first timestamp and a time of image capture at the imaging device.

* * * * *